(12) United States Patent
Greene

(10) Patent No.: US 6,450,456 B1
(45) Date of Patent: *Sep. 17, 2002

(54) AIRBORNE SAFE LANDING POWER CONTROL SYSTEM AND METHOD

(75) Inventor: Leonared M. Greene, White Plains, NY (US)

(73) Assignee: Safe Flight Instrument Corporation, White Plains, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,072

(22) Filed: Dec. 20, 1999

(51) Int. Cl.[7] .................................................. B64L 3/11
(52) U.S. Cl. .......................... 244/186; 701/16; 244/182
(58) Field of Search ................................. 244/186, 188, 244/183, 181, 182, 194, 195; 701/18, 15, 5, 8, 16, 210

(56) References Cited

U.S. PATENT DOCUMENTS

| 3,031,662 A | 4/1962 | Bond |
| 3,126,175 A | 3/1964 | Lowell |
| 3,252,675 A | 5/1966 | Close et al. |
| 3,291,421 A | 12/1966 | Kramer et al. |
| 3,333,795 A | 8/1967 | Hattendorf et al. |
| 3,358,948 A | 12/1967 | Sims |
| 3,463,422 A * | 8/1969 | Watson ........................ 244/182 |
| 3,591,110 A * | 7/1971 | Dramer et al. .............. 244/182 |
| 3,665,465 A * | 5/1972 | Miller ......................... 244/182 |
| 3,824,381 A | 7/1974 | Swern |
| 3,892,373 A | 7/1975 | Doniger |
| 3,908,934 A * | 9/1975 | Schloeman .................. 244/188 |
| 3,998,411 A * | 12/1976 | Blechen ...................... 244/188 |
| 4,164,340 A | 8/1979 | Simpson |
| 4,189,777 A * | 2/1980 | Kuntman ..................... 244/182 |
| 4,209,152 A * | 6/1980 | Stephen ....................... 244/182 |
| 4,232,839 A * | 11/1980 | Sicre et al. .................. 244/188 |
| 5,000,404 A * | 3/1991 | Martorella ................... 244/188 |
| 5,078,345 A * | 1/1992 | De Vries et al. ............. 244/182 |
| 5,667,166 A | 9/1997 | Tran et al. |
| 6,186,447 B1 * | 2/2001 | Virdee ......................... 244/188 |

* cited by examiner

Primary Examiner—Galen L. Barefoot
(74) Attorney, Agent, or Firm—Dennison, Schultz & Dougherty

(57) ABSTRACT

An airborne power control system for automatically controlling the power of an aircraft during landing is disclssed. The system includes a computer and a minimum airspeed program as a function of altitude. A radio altimeter or the like senses the instantaneous altitude of the aircraft while a pitot tube or the like measures indicated airspeed. A computer and program compare programmed airspeed with actual airspeed for a given altitude. And, a servomotor is provided for decreasing engine thrust where the actual airspeed exceeds the programmed airspeed at any given altitude. An inhibitor inhibits the decrease in engine thrust if the airspeed drops below the programmed airspeed.

4 Claims, 3 Drawing Sheets

AIRBORNE SAFE LANDING POWER CONTROL SYSTEM AND METHOD

FIELD OF THE INVENTION

This invention relates to an airborne power control system and method and more particularly to a power control system and method for automatically controlling power during the landing of an aircraft.

BACKGROUND FOR THE INVENTION

The need for a highly reliable and safe automatic landing system for aircraft has been recognized. It has also been recognized that any such system should be fully operable under adverse weather conditions with reliability. Such systems must automatically land an aircraft safely in fog or rain, at night, with heavy payloads and produce a smooth landing under any such conditions.

In order to meet the requirements for reliability and to provide for smooth landings under adverse conditions, an automatic landing system must contain control equipment which is insensitive to outside disturbances normally encountered in landings.

In the past, various control systems have been used to control aircraft in-flight. For example, glide slope systems have been used to guide an aircraft down to a flare altitude of about 50 feet. However, at flare altitude, other means of control are provided to alter the aircraft's flight path and achieve a touchdown at a much reduced rate of descent.

One system for automatically landing an aircraft is disclosed in the U.S. Pat. No. 3,031,662 of Bond. In that system, a flare path is provided which accurately controls the rate of descent of the aircraft in proportion to the altitude. If the rate of descent of an aircraft is controlled in proportion to altitude, an exponential flare may be obtained which provides the necessary flare path to meet the design requirements.

In the preferred embodiment of the Bond system, the altitude and altitude rate signals are obtained from a radio altimeter and the acceleration signal is obtained from a vertical accelerometer. The three signals are then combined to provide an indication to an automatic control system of the relation of the actual landing path described by the aircraft to the theoretical curve described by an altitude equation.

Notwithstanding past developments and the need for reliable automatic landing system, such systems have not enjoyed widespread commercial success. It is believed that such systems fail to provide the needed flexibility, reliability and rapid response time to accommodate rough air, head and tail wind oscillations and other weather related problems.

It is now believed that there may be a large commercial demand for an improved control system for landing an aircraft in accordance with the present invention. Such systems will provide automatic landing from flare to touchdown and control the curvilinear flight path for the final 50 feet of descent. It is believed that there is a demand for a system and method which controls two; parameters of importance, i.e. the vertical velocity and airspeed. Such systems and methods must maintain certain minimum airspeed and at the same time provide sufficient lift to prevent the aircraft from stalling.

BRIEF SUMMARY OF THE INVENTION

In essence, the present invention contemplates an airborne safe landing power control system and method. The system comprises an airborne computer and means for entering a minimum airspeed program as a function of altitude in said computer. The system also includes means such a radio altimeter for sensing the instantaneous altitude of the aircraft and means for sensing the aircraft's vertical velocity during a landing maneuver, i.e. from about 50 feet altitude to touchdown. Means for measuring airspeed are also provided. In addition, the system includes comparator means for comparing the programmed airspeed with the actual airspeed at a given altitude. Key elements of the system include throttle retard means such as a servomotor for decreasing the engine thrust when the actual airspeed exceeds the programmed airspeed at any given altitude and inhibiting means for inhibiting the throttle retard means if the airspeed drops below the programmed airspeed.

The invention will now be described in connection with the accompanying drawings.

DESCRIPTION OF THE PREFERRED EMBODIMENT OF THE INVENTION

An aircraft safe landing power control system in accordance with the present invention incorporates an improved means for adjusting the thrust by using an automatic throttle system during landings.

Figure 1:
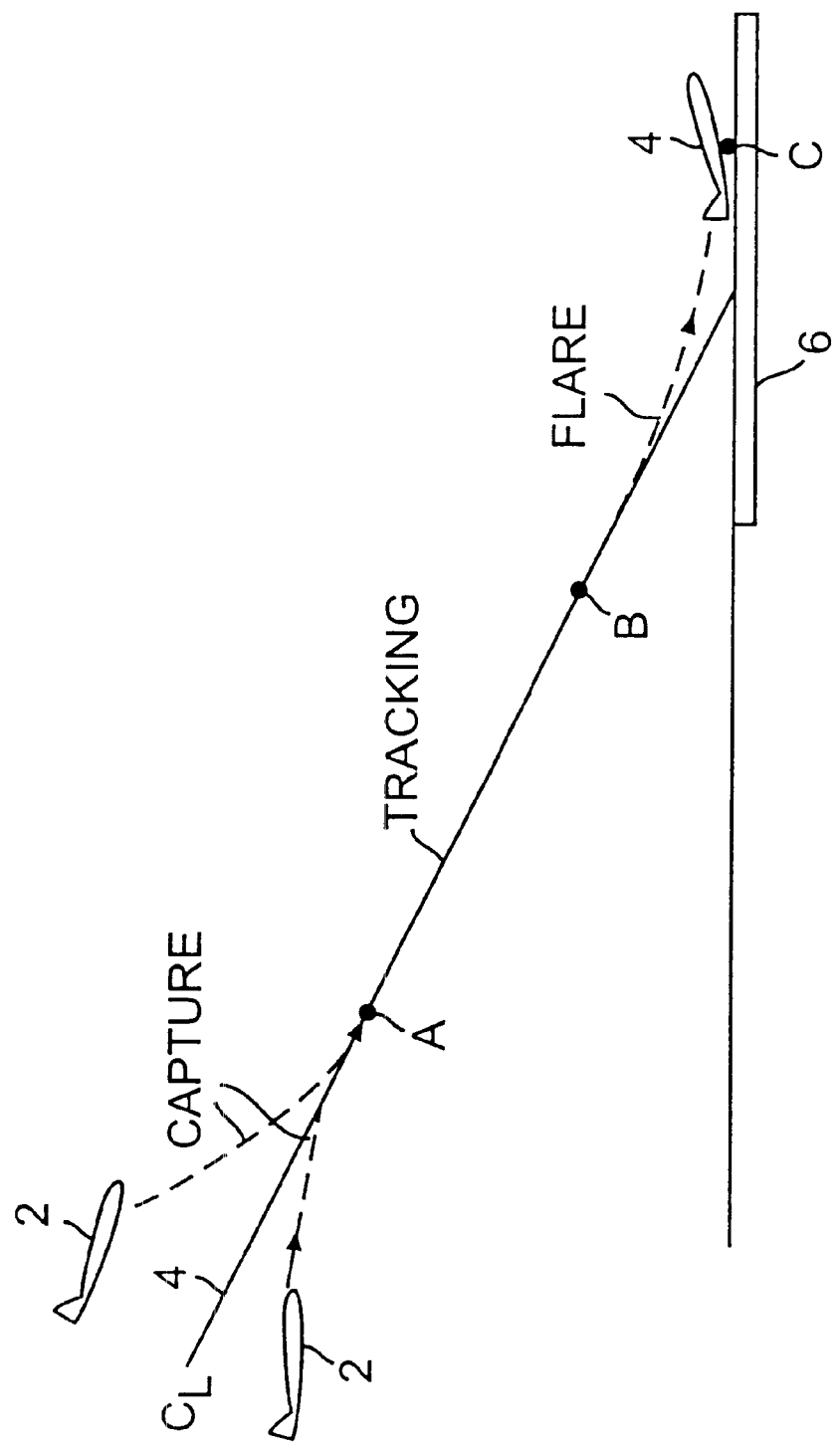
FIG. 1 is a diagrammatic representations showing a typical glide path capture, tracking and flare maneuver as an aircraft approaches and lands at an airport.

As illustrated in FIG. 1, an aircraft 2 is controlled by conventional means to capture an ILS glide path means or center line 4 as for example disclosed in the U.S. Pat. No. 3,892,373 of Doniger,which is incorporated herein in its entirety by reference. At a point A from either level flight below the centerline or from descending flight above the centerline 4, the aircraft 2 tracks the beam centerline 4 from point A to point B. At point B, the flare altitude of about 50 feet above a runway 6, a flare maneuver is engaged to control the aircraft to touch down at point C. It is during the flare maneuver, i.e. from point B to point C that the present invention is applicable.

Figure 2:
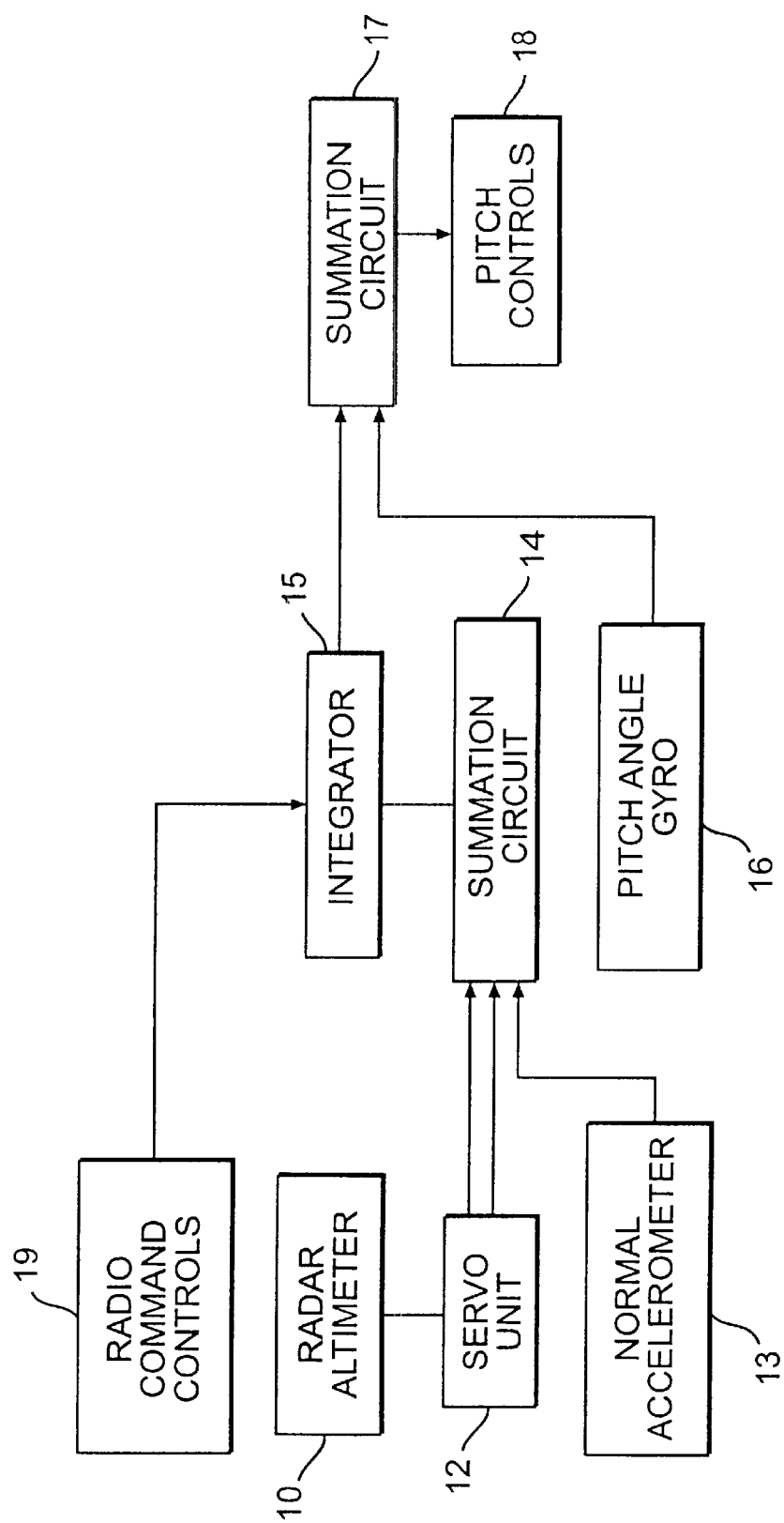
FIG. 2 is a block diagram of a prior art landing system.

FIG. 2 illustrates a prior art automatic landing system which utilizes the sum of altitude rate and acceleration signals to control the pitch angle of an aircraft in a predetermine flare path. This system is described in further detail in the earlier mentioned U.S. Pat. No. 3,031,662 of Bond which is also incorporated herein in its entirety by reference.

As disclosed by Bond, a frequency modulated radar altimeter 10 is mounted within an aircraft for obtaining accurate low level altitude information. The radar altimeter 10 provides a continuous and smooth altitude signal to a servo unit 12 which differentiates the altitude signal and produces an altitude rate signal. The altitude rate signal and altitude signals are then fed into a summation circuit 4 which combines the altitude and altitude rate signals with an acceleration signal received from a normal accelerometer 13. The summation circuit 4 supplies an output error signal to an integrator 15 which is equal to the sum of the altitude rate and acceleration signal. A radio command control 19 supplies a signal equal to the pitch angle command at the initiation of a flare path.

The integrator 15 integrates the output error signal from the summation circuit 14 and the initial pitch angle command signal from the radio command control 19 to provide a pitch angle command signal to a summation circuit 17. Receiving signals from summation circuit 14 which are uneven or erratic, the integrator 5 smooths the signals by integration. The gyro 16 measures the actual pitch angle of the aircraft and feeds the signal into the summation circuit 17. Thus, summation circuit 17 compares the output from integrator 15 with a signal from the gyro 16 and provides an, output signal proportional to the difference between the actual pitch angle provided by the gyro 16 and the command pitch angle provided by the integrator 15 to pitch controls 18.

The throttle control method and system in accordance with the present invention may be combined with pitch control guidance as defined above and/or systems to control roll and/or airspeed. The airspeed may then be controlled by varying the attitude and the thrust of the engines.

Below a chosen altitude, airspeed is determined in a prescribed manner for use by an automatic throttle system. The desired airspeed can be a function of a number of variables and may be linear, non-linear, time dependent, etc. However, in a first embodiment of a landing system in accordance with the present invention, the desired airspeed is a non-linear function of altitude wherein the rate of airspeed decrease with respect to altitude is greatest at touch down. If the aircraft's airspeed is greater than the required programmed airspeed, the landing system causes the throttles to retard at a fixed or given rate. However, if the airspeed drops below the programmed airspeed, the throttle retard is inhibited.

Figure 3:
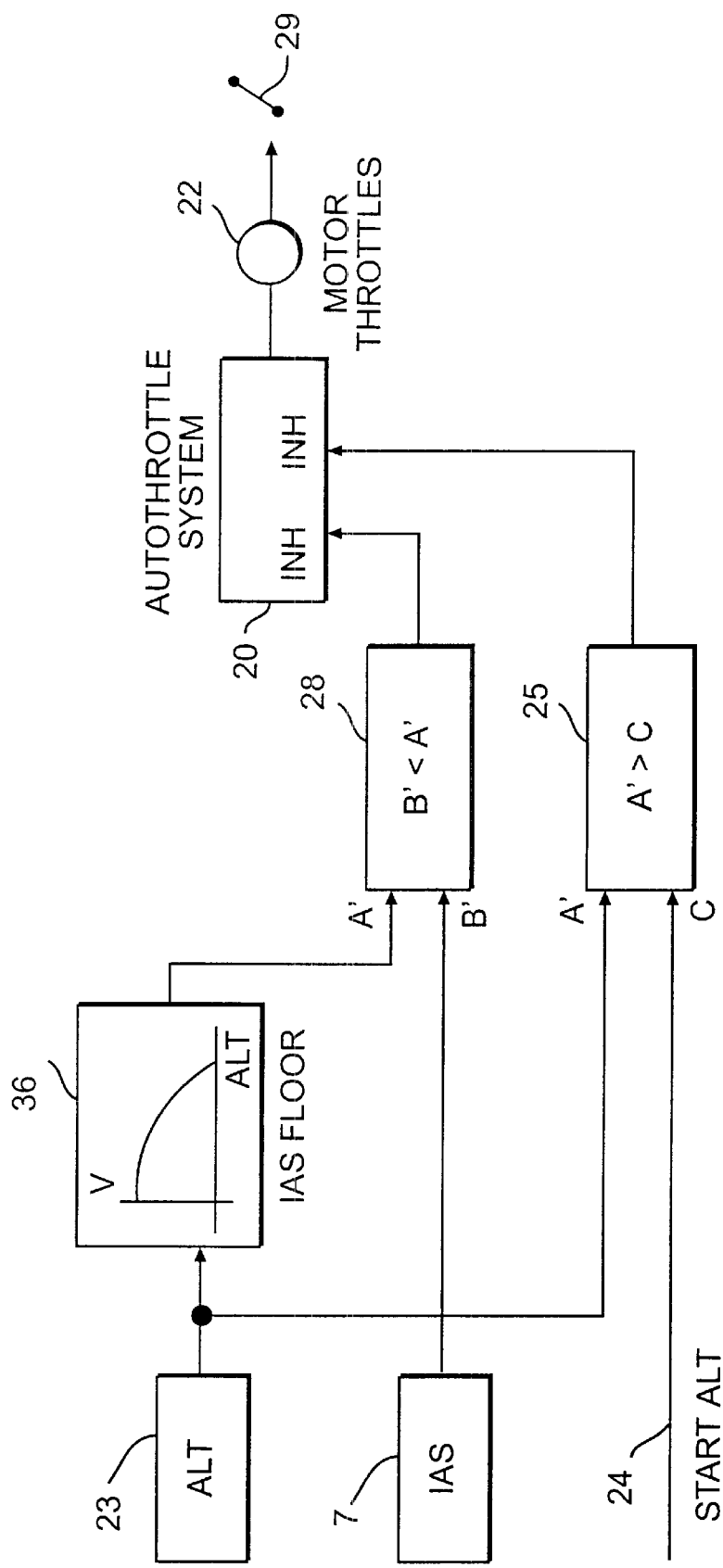
FIG. 3 is a block diagram illustrating an airborne safe landing power control system and method in accordance with the present invention.

An airborne safe landing power control system and method in accordance with the present invention is illustrated in more detail in FIG. 3. As illustrated, an auto throttle system 20 is in its landing mode and is programmed to retard the throttle 29 by driving a throttle servomotor 22 at a fixed rate. Then, if the aircraft's altitude as determined by a radio altimeter 23 indicates that the aircraft 2 (FIG. 1) is above the altitude chosen for the start of the landing as indicated by 24, i.e. point B, (FIG. 1), a logic comparator 25 inhibits the servomotor 22 until the aircraft 2 is below that altitude.

A minimum airspeed program 26 (installed in a suitable computer) as a function of altitude is compared to the indicated airspeed 27 of the aircraft (provided by a pitot tube or the like) by a logic comparator 28. When the airspeed drops below the minimum, the servomotor 22 is also inhibited.

While the invention has been described in connection with its preferred embodiment, it should be recognized that changes and modifications can be made therein without departing from the scope of the appended claims.

As contemplated by the present invention, the power or thrust is controlled by means of throttle closing as opposed to opening and closing the throttle. This approach overcomes the problem of a time delay in the spooling up of a jet engine. In other words, the required energy is adjusted directly and the only delay is the drive time of a servomotor in shutting down an engine. For example, the loss of an engine during the final 30' of altitude would result in underspeed. Therefore, the throttles don't close and the remaining aircraft engines maintain thrust.

This approach also takes care of underspeed, power loss, loss of headwind, insufficient speed or the wrong glide path angle. Under such circumstances, the engines maintain more power for a longer duration of time. However, if there is a problem of overpower prompt retardation of the throttle is provided by the servomotor.

Therefore, the addition of the present invention with a pitch guidance system as disclosed in the prior art adds a forth dimension of control, i.e. power in addition to the control of pitch, roll, and airspeed.

What is claimed is:

1. An airborne safe landing power control system for an aircraft including an autothrottle system with a landing mode and a minimum airspeed program as a function of altitude during a landing maneuver, a radio altimeter for sensing the instantaneous altitude of an aircraft, means for sensing the aircraft's airspeed and comparator means for comparing the programmed airspeed with the actual airspeed at a given altitude and throttle retard means for decreasing the engine thrust when the actual airspeed exceeds the programmed airspeed at any given altitude, and first inhibiting means for inhibiting the throttle retard means when the aircraft's altitude as determined by said radio altimeter indicates that the aircraft is above a preselected altitude for the start of a landing maneuver and second inhibiting means for inhibiting the throttle retard means if the airspeed drops below the programmed airspeed.

2. An airborne safe landing power control system for an aircraft in accordance with claim 1 which includes an autothrottle system with a landing mode and in which said authothrottle system is programmed to retard the throttles at a fixed rate during the landing maneuver unless the retardation is inhibited by the inhibiting means.

3. An airborne safe landing power control system for an aircraft in accordance with claim 2 which includes a servomotor, for retarding the throttles.

4. An airborne safe landing power control system for an aircraft comprising an autothrottle control system and means for programming said autothrottle system for a landing mode wherein a minimum airspeed is a function of altitude, means including a radio altimeter for measuring the instantaneous altitude of the aircraft and means for measuring the indicated airspeed of an aircraft, a throttle and servomotor for retarding said throttle at a fixed rate to thereby decrease power in response to a signal from said autothrottle control system, first means for inhibiting said servomotor when the aircraft's altitude as determined by said radio altimeter indicates that the aircraft is above a preselected altitude for the start of a landing maneuver and second inhibiting means for inhibiting the servomotor when the airspeed drops below the programmed airspeed.

* * * * *